C. B. HUTCHINSON.
Board and Log Rule.
No. 7,416.
Patented June 4, 1850.
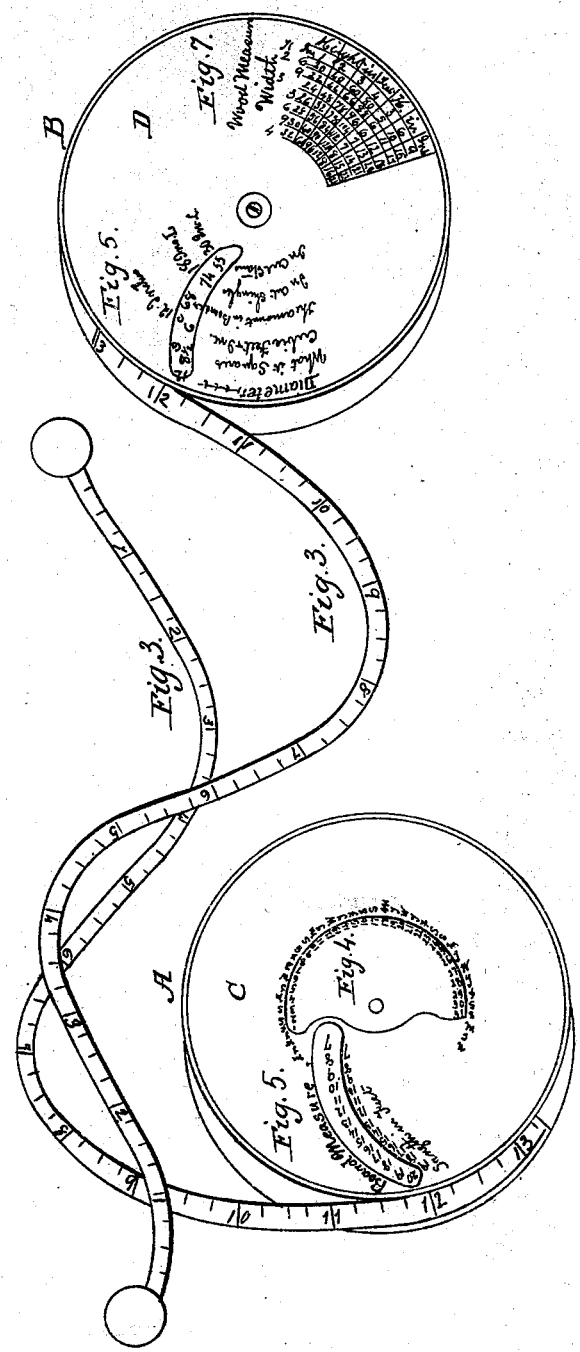

UNITED STATES PATENT OFFICE.

CHAS. B. HUTCHINSON, OF WATERLOO, NEW YORK.

BOARD AND LOG RULE.

Specification of Letters Patent No. 7,416, dated June 4, 1850.

*To all whom it may concern:*

Be it known that I, CHARLES B. HUTCHINSON, of the town of Waterloo, county of Seneca, and State of New York, have invented a new and useful machine for measuring lumber, such as boards, logs, showing the number of feet they contain, the number of feet of boards, the number of shingles or staves, that can be cut from a log of a given size, containing also a table of wood measure and a table for showing the day of the month, which machine I propose to call a "Rotary Board and Log Rule and Measure"; and I do declare that the following is a full, clear, and exact description of the construction and operation of the same, reference being had to the annexed drawings, making part of this specification in which—

Letter "A" is a view of one side and letter "B" of the other side of said machine. Figure "3" the tape as drawn from the wheel inclosed by the sides of the machine. Fig. "4" is a plate distinct from the case and movable on it, and is numbered as shown in the drawings from 1 to 31 inclusive, the number of days in the month. On plate "C" are marked the initial letters of the days of the week corresponding with or made to do so by moving the plate Fig. "4" with the figures indicating the day of the month. Fig. "5" (letter A) is an inner plate which revolves as the tape is drawn out on its axis. Fig. "6" (letter B) is an inner plate revolving as Fig. "5" above described. Fig. "7" (letter B) is a table showing the number of feet in a given quantity of wood.

To enable others skilled in the art to make and use my invention I will proceed to describe its construction and operation.

First, its construction: Two circular plates of brass or other material (letters C and D) are made and held together by an outer rim through which is made to pass the tape wound around the wheel inclosed by said plates on the sides of which wheel or the hub of it, is fixed plates of brass or other material as shown in the drawings Figs. 5 and 6. The tape is in the usual form numbered in inches and being 48 inches in length. On the circular plates 5 and 6 is stamped or printed the tables of figures as shown in the drawings.

Its operation: First, to measure boards take the machine in the left hand and with the right draw out the tape the width of the board and so far that the figure indicating its width shall be opposite the opening in the plate "C" (letter A). Then opposite the figures on the plate "C" at the side of the opening therein (which figures indicate the length of the board from 7 to 19 feet) will be seen on the inner plate Fig. "5" and on the same circular line the number of feet contained in the board. For example as shown in the drawings. If the board be 12 inches wide and 19 feet long the inner plate "5" shows that it contains 19 feet. If 18 feet long then 18 feet is contained. If the board is 16 inches wide and the tape is drawn out 16 inches as before directed the inner plate will show that in a board of that width and 19 feet long 25 feet are contained and so on. As the tape is drawn out 12, 15, 20, or any number of inches a corresponding number is shown on the outer edge of the inner plate Fig. "5".

Second to measure logs—and first to show what a log of a certain diameter will square. Second, its cubical contents. Third the number of feet of boards that can be cut from the log. Fourth the number of cut shingles and fifth the number of cut staves. Take the machine in the right hand and with the left draw out the tape the diameter of the log and so far that the figure on the tape corresponding with its diameter shall be opposite the opening in plate "D" (letter B). Then will be seen on the inner plate Fig. "6" through said opening at the side thereof and on the circular line with the words on plate D "What it squares" what the log will square, and opposite the words on said plate D "Cubic feet and inches" its cubical contents, and opposite the words "The amount in boards". "In cut shingles" and "In cut staves" on said plate "D" will be found on said plate "6" the number of feet of boards, the number of cut shingles, and the number of cut staves that said log will make. In this measurement it is assumed that the log for the square, cubic and boards is one foot long, for the shingles 18 inches, and for the staves 30 inches long. So that for logs of greater length multiplication must be made accordingly. For example as shown in the drawings letter "B". If the tape be drawn out 12 inches a corresponding figure will be found on the outer edge of the inner plate Fig. "6" under which will be found and as before stated on the same circular line with the proper words on plate "D" first 8½, the number of inches the log will square; 6 (meaning six twelfths of a cubic foot) the amount of cubic measure contained, 5 the number of feet of boards said log will make, 74 the number of cut shingles, and 55 the number of cut staves that can be cut from the log. The log as before stated for the square, cubic and boards to be 12 inches long, for the shingles 18, and for the staves 30 inches long. The shingles to be ⅜ of an inch thick. A spring is contained in the wheel above described in the ordinary manner to draw back the tape.

I do not claim as my invention the table of the day of the month or of wood measure or the calculations or products on the inner plates of said machine, nor the rotary tape measure; but What I do claim as my invention and desire to secure by Letters Patent is—

The combination with the inner revolving plate of the rotary tape measure of the several tables thereon substantially as described.

CHARLES B. HUTCHINSON.

Witnesses:
STERLING G. HADLEY,
WM. KNOX.